United States Patent [19]
Bray

[11] Patent Number: 5,835,219
[45] Date of Patent: Nov. 10, 1998

[54] DEVICE FOR DETERMINING THE SHAPE OF THE WAVE SURFACE TRANSMITTED BY A SUBSTANTIALLY PARALLEL-FACED TRANSPARENT COMPONENT

[75] Inventor: Michaël Bray, Olivet, France

[73] Assignees: Compagnie Industrielle Des Lasers Cilas; Le Commissariat A L'Energie Atomique, both of Paris, France

[21] Appl. No.: 881,597

[22] Filed: Jun. 24, 1997

[30] Foreign Application Priority Data

Jul. 10, 1996 [FR] France ................................. 96 08598

[51] Int. Cl.$^6$ ...................................................... G01B 9/02
[52] U.S. Cl. ............................................ 356/359; 356/360
[58] Field of Search ..................................... 356/359, 360

[56] References Cited

U.S. PATENT DOCUMENTS

| | | | |
|---|---|---|---|
| 3,338,130 | 8/1967 | Gaffard | 88/14 |
| 4,792,228 | 12/1988 | Haffner | 356/138 |
| 5,337,140 | 8/1994 | Hagiwara et al. | 356/237 |
| 5,343,410 | 8/1994 | Tsujiuchi et al. | 364/525 |
| 5,473,435 | 12/1995 | Masuyuki et al. | 356/372 |
| 5,488,477 | 1/1996 | De Groot | 356/360 |

FOREIGN PATENT DOCUMENTS 904 353 A   2/1954   Germany .
42 18 382 A1   9/1993   Germany .

OTHER PUBLICATIONS

Patent Abstracts of Japan, vol. 9, No. 79 (P–347) [1802], Apr. 9, 1985.

Patent Abstracts of Japan, vol. 13, No. 580 (P–980) [3928], Dec. 21, 1989.

French Search Report, 3 pages, dated Mar. 4, 1997.

*Primary Examiner*—Robert Kim
*Attorney, Agent, or Firm*—Marshall, O'Toole, Gerstein, Murray & Borun

[57] ABSTRACT

The present invention relates to a device for determining the shape of the wave surface transmitted by a substantially parallel-faced transparent component (P), which includes a support (S) for the component (P), an interferometer (I), means for moving the support (S), and a control unit which determines, from the measurements by the interferometer (I), the shape of said wave surface. According to the invention, the support (S) is made in such a way as to let the light beam (FM) emitted by the interferometer (I) and transmitted by the component (P), which is transparent, pass through it, and said device includes a swivelling mirror (M1) arranged approximately orthogonally to the beam (FM) transmitted by the component and oriented in such a way as to send said beam (FM) back in the emission direction (D1).

10 Claims, 2 Drawing Sheets

DEVICE FOR DETERMINING THE SHAPE OF THE WAVE SURFACE TRANSMITTED BY A SUBSTANTIALLY PARALLEL-FACED TRANSPARENT COMPONENT

The present invention relates to a device for determining the shape of the wave surface transmitted by a substantially parallel-faced transparent component.

More specifically, it is sought to measure the height of minute "asperities" and/or "depressions", for example of the order of a nanometer and more, for periods greater than approximately 0.1 mm over the entire said substantially plane surface.

To do this, the known principle of interferometric measurements is used. According to this principle, which is generally employed for reflection measurements, light interference is made to occur by the reflections of a measurement light beam, emitted by an interferometer, respectively off the surface of the component to be measured and off a parallel or substantially parallel surface of a reference plate. The interference thus created is manifested in the form of interference fringes which are capable of being measured by the interferometer and are representative of the distance between the two surfaces at the points in question.

Thus, to be able to determine accurately the shape of the wave surface from such distances, it is necessary for the planarity of the reference plate to be of the order of magnitude of the component to be measured and for the size of said reference plate to be at least equal to that of said surface of the component. In addition, the measurement beam must also have a diameter of at least equivalent size.

The aforementioned physical constraints do not present too many difficulties, especially technical difficulties, as long as the surface of the component to be measured is of small size.

However, as soon as the surface of the component exceeds one or a few hundred millimeters, the tooling necessary for the measurement becomes heavy, bulky, expensive and difficult to use. Thus, in order to measure a surface having a diagonal of 600 mm for example, it is necessary to use an expander for the measurement beam coming from the interferometer several meters in length.

Thus, in order to remedy these drawbacks, a known solution, described especially in an article by Cochran and Creath appearing in the journal "Applied Optics", May 15, 1988, under the title "Combining multiple-subaperture and two-wavelength techniques to extend the measurement limits of an optical surface profiler", recommends using a standard interferometer, the measurement beam diameter of which is small, and taking measurements on a number of measurement areas completely covering said surface, each of said measurement areas being at least partially overlapped, over an overlap sector, by an adjacent measurement area.

The measurements on said overlap sectors are used to fit together the measurements taken on the various adjacent measurement areas, which enables the images of said measurement areas to be joined together in such a way as to obtain an image relating to the entire surface of the component, indicating the shape of the wave surface reflected by the component.

In a known manner, a device for measuring the shape of the wave surface reflected by a plane component, by implementation of the abovementioned known solution, using the measurement of partially overlapping measurement areas, usually includes, as described for example in U.S. Pat. No. 5,343,410:

a support bearing the component to be measured;

an interferometer arranged opposite the reflection surface of the component, capable of emitting a measurement light beam onto a measurement area of said surface and of measuring the interference fringes created by the reflections of said measurement beam, respectively off said surface and off a reference plate arranged so as to be substantially parallel to said surface over the path of said measurement beam. Within the context of the present invention, a component will be regarded as being "transparent" when it lets said measurement light beam pass through it;

movement means capable of moving, on the one hand, said support in a first direction of the plane of the component and, on the other hand, said interferometer in a second direction of the plane of the component, orthogonal to said first direction, in such a way as to cause said measurement beam to be scanned over the surface of the component so as to enable said interferometer to take measurements on a number of measurement areas completely covering said surface, each of said measurement areas being at least partially overlapped, over an overlap sector, by an adjacent measurement area; and a control unit which controls said interferometer and said movement means and determines, from the measurements taken by the interferometer on all said measurement areas and according to the aforementioned known principle, the shape of said wave surface reflected by the component.

The device described above does not enable measurements to be taken by transmission of the measurement beam, as is necessary for certain transparent components.

What is more, the measurements cannot be taken automatically. This is because this device, which is in particular designed to measure large-sized components, as indicated previously, requires a robust and dimensionally tailored support. It is then technically impossible to obtain and/or maintain precise parallelism over the entire surface, to within a few micrometers, between the reference plate and that surface of the component which is to be measured, the component being borne by this support, especially because of the presence of bending and/or of play at the support and where the component is fixed to the support.

This drawback makes it necessary, before each measurement of a measurement area, to check the parallelism between the reference plate and the surface of the component, thereby making the operation lengthy and tedious.

The object of the present invention is to overcome these drawbacks. It relates to a device for determining, rapidly and accurately, the shape of the wave surface transmitted by a transparent component from measurements which can be taken automatically.

For this purpose, according to the invention, the device which includes:

a support bearing said component;

an interferometer arranged opposite a surface of the component, capable of emitting a measurement light beam onto a measurement area of said surface and of measuring the interference fringes created by the wave surface of the measurement beam transmitted by the transparent component and the wave surface of said measurement beam reflected by a reference plate arranged so as to be substantially parallel to said surface of the component over the path of said measurement beam;

movement means enabling, by their action, said measurement beam to be scanned over the surface of the component so as to enable said interferometer to take measurements on a number of measurement areas completely covering said surface, each of said measurement areas being at least partially overlapped, over an overlap sector, by an adjacent measurement area; and a control unit which controls said interferometer and said movement means and determines, from the measurements taken by said interferometer on all the measurement areas, the shape of said wave surface transmitted by the component, the measurements taken on the overlap sectors being used to fit together the measurements taken on the corresponding adjacent measurement areas, is noteworthy in that said support is made, at least on its part bearing said component, in such a way as to let the measurement light beam emitted by the interferometer and transmitted by said transparent component pass through it, which device additionally includes a first swivelling mirror which is arranged on the side opposite the interferometer with respect to the support and to the component and which is placed in the path of the measurement beam emitted by the interferometer and transmitted along a transmission direction by the component and the support, said first mirror being arranged approximately orthogonally to said transmitted measurement beam and being oriented in such a way as to send said measurement beam back in said transmission direction.

Thus, by virtue of the invention, measurements may be taken by transmission through said transparent component.

In addition, the arrangement according to the invention of said first mirror avoids disturbing the thermal equilibrium of the device during manipulations since the operator of said device is not required to bring his hands and his body to the component.

Of course, said first mirror may be oriented manually. However, preferably, the orientation of said first mirror is controlled automatically by said control unit.

Within the scope of the present invention, the measurement beam may be transmitted by the component and the support in a transmission direction which is either orthogonal or inclined with respect to the latter, thereby making it possible, depending on the embodiment chosen, to take either measurements at normal incidence or measurements at non-normal incidence.

Moreover, advantageously, the device according to the invention includes, in addition, a second swivelling mirror, which is arranged in the path of the measurement beam between the interferometer and the component in such a way as to direct the measurement beam emitted by said interferometer, by reflection, to said component.

In this case, in one advantageous embodiment, said mirror is arranged in such a way as to direct the measurement beam in an inclined manner with respect to the surface of the component, thereby enabling measurements to be taken at non-normal incidence without moving the entire device.

In a second particularly advantageous embodiment, said second mirror is arranged in such a way as to direct the measurement beam orthogonally onto the surface of the component, and said device additionally includes an optical sensor, for example a camera of the CCD type, capable of determining the position of the image of a light point of the measurement beam, reflected by the surface of the component, said light point being located at a predefined reference position and the orientation of said second mirror being controlled in such a way as to bring the position of the image of the light point, determined by the optical sensor, back to said reference position automatically.

By virtue of the characteristics of this second embodiment, it is possible, in addition to measurements by transmission, also to take measurements by reflection of the measurement beam, while still overcoming the aforementioned parallelism problems existing in the prior art, because of the automatic collimation obtained by the control of said second mirror.

Advantageously:

the orientation of said second mirror is controlled by the control unit which receives the measurements taken by said optical sensor; and/or said optical sensor is integrated into the interferometer.

Furthermore, in order to optimize the processing, the orientation of said second mirror is refined, before each measurement of a measurement area, on the basis of the processing of interference fringes measured by the interferometer.

Moreover, advantageously, the device according to the invention includes a removable plate, having dimensions at least equal to the amounts of travel of the support, mounted on the support and provided with a number of characteristic elements, the effective positions of which are known and are capable of being measured by the interferometer, the comparisons respectively between the positions measured by the interferometer and the known effective positions of these characteristic elements making it possible to determine the precise relative position between the support and the measurement beam emitted onto the component.

The figures of the appended drawing will make it clear how the invention can be realized. In these figures, identical references denote similar elements.

Figure 1:
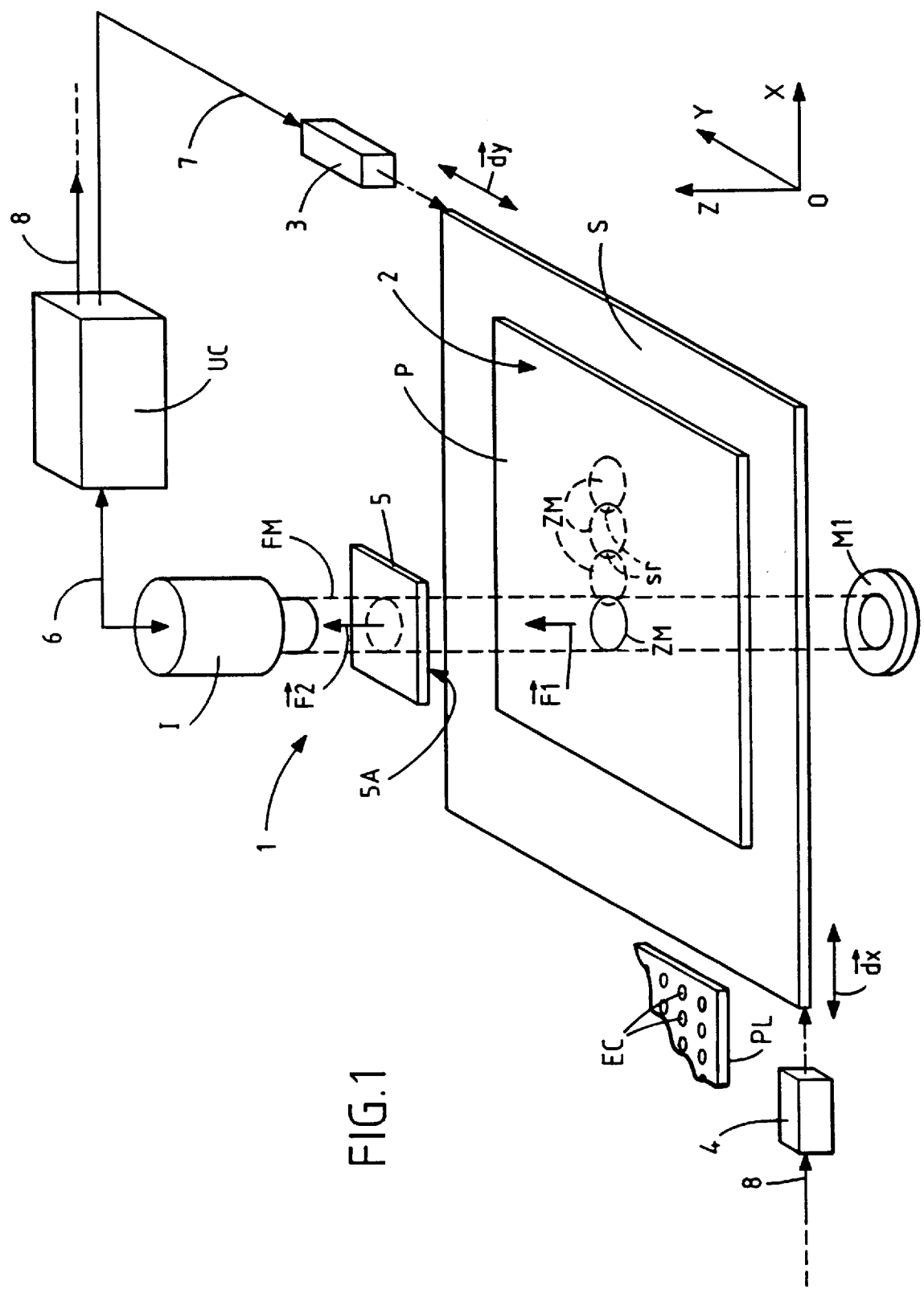
FIG. 1 shows diagrammatically a device for determining the shape of the wave surface transmitted by a transparent component from interferometric measurements.

The device 1 according to the invention and shown in FIG. 1 is intended to determine the shape of the wave surface, not shown, transmitted by a substantially parallel-faced transparent component P.

More specifically, said device 1 is designed to measure the height of minute "asperities" and/or "depressions", not shown, in the wave surface in the direction OZ orthogonal to the plane OXY of the component P.

For this purpose, said device 1 includes, in a known manner:

a moveable support S of plane general shape, bearing said component P and capable of being moved in the plane OXY by movement means 3 and 4, as detailed below;

an interferometer I, of the usual type, fixed to a support, not shown, opposite a surface 2 of the component P and capable of emitting a measurement light beam FM onto a measurement area ZM of said surface 2 and of measuring the interference fringes created by the wave surface of said measurement beam FM which is transmitted (twice, as explained below) by the transparent component P, as illustrated by an arrow $\vec{F1}$, and the wave surface of the measurement beam FM reflected by the face 5A of a transparent reference plate 5 designed so as to be substantially parallel to the surface 2 in the path of the measurement beam FM, as illustrated by an arrow $\vec{F2}$. The interference fringes thus created are representative of the distance between the reflection face 5A of the reference plate 5 and the transmitted wave surface;

said movement means 3 and 4, produced for example in the form of screws and a motor or a belt and a notched pulley, which are capable of moving the support S respectively along the direction OX, as illustrated by a double arrow $\vec{dx}$, and along the direction OY, as illustrated by a double arrow $\vec{dy}$. Moving the support S then enables, by means of the interferometer I, measurements to be taken on a number of measurement areas ZM (only a few of these have been shown in FIG. 1) completely covering said surface 2, each of said measurement areas ZM being at least partially overlapped, over an overlap sector sr, by an adjacent measurement area. The measurements taken on said overlap sectors sr enable the measurements taken on the corresponding adjacent measurement areas to be fitted together; and a control unit UC which controls said interferometer I, as illustrated by a link 6, and said movement means, 3 and 4, as illustrated respectively by links 7 and 8, and which determines, from the measurements taken by the interferometer I on all said measurement areas ZM (and therefore also on the overlap sectors sr), the shape of the wave surface transmitted by the component P.

Figure 2:
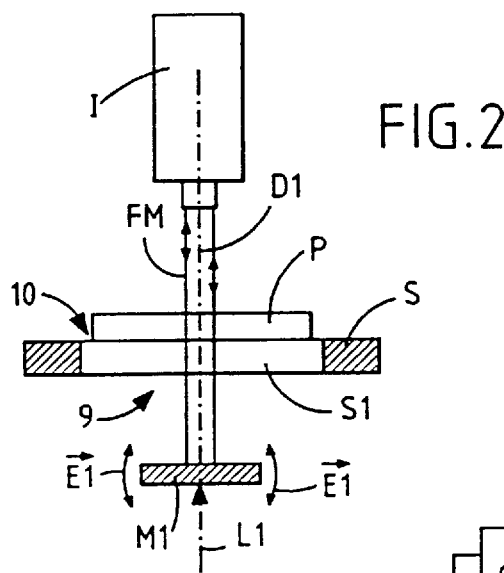
FIG. 2 illustrates diagrammatically the essential characteristics of the device according to the invention.

According to the invention, in order to be able to take measurements by transmission through said transparent component P, the device 1 according to the invention additionally has the following characteristics, as shown in FIG. 2:

the support S is made, on a part S1 corresponding at least to the part bearing the component P, in such a way as to let the measurement light beam FM, emitted by the interferometer I and transmitted by said component P which is transparent, pass through it; and said device 1 additionally includes a swivelling mirror M1, as indicated by arrows $\vec{E1}$, which is arranged opposite that face 9. of the support S which is opposite that 10 bearing the component P, and which is placed in the path of the measurement beam FM emitted by the interferometer I and transmitted along a transmission direction D1 by the component P and the support S, said mirror M1 being arranged approximately orthogonally to said transmitted measurement beam FM and being capable of being accurately oriented in such a way as to send said beam FM exactly back in said transmission direction D1 to the interferometer I. The corresponding wave surface (illustrated by the arrow $\vec{F1}$ in FIG. 1) is therefore transmitted twice through the support S and the component P and reflected once by the mirror M1.

Thus, because the mirror M1 sends the light beam FM back to the interferometer I, the interferometric measurements necessary for implementing the invention may be taken.

In addition, by accurately orienting said mirror M1, any problem of a defect in parallelism in the device 1 is avoided since the movements of the component P do not affect the direction of propagation of the light beam FM passing through the component.

In the example shown in FIG. 2, the transmission direction D1 is orthogonal to the surface of the component P. Of course, within the scope of the invention, the interferometer I can also be designed in such a way as to obtain a transmission direction D1 which is not orthogonal to this surface.

The mirror M1, whose orientation is controlled by means of a link L1 connected, for example, to the control unit UC (not shown in FIGS. 2 to 4), is preferably motor-driven, but not automated, so as to be able to adjust the collimation remotely, before the measurements, without thereby disturbing the thermal equilibrium of the device 1.

In the embodiment shown in FIG. 2, the device 1 according to the invention only allows measurements to be taken by transmission of the measurement beam FM through the component P.

Figure 3:
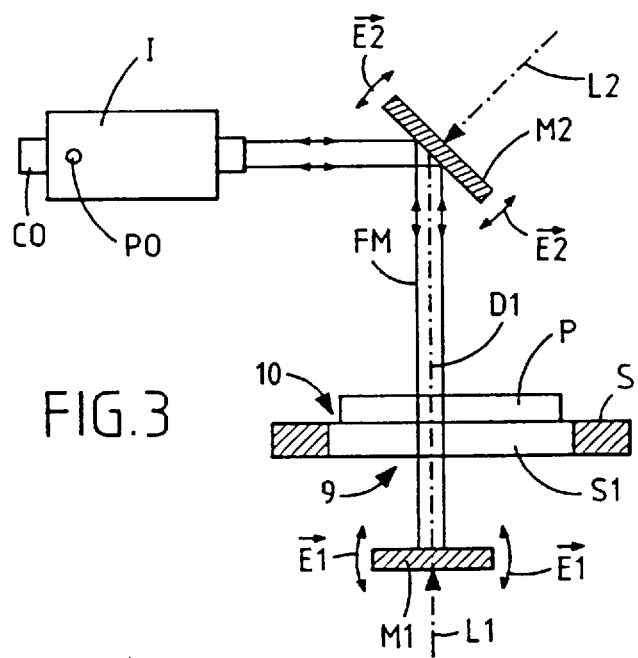
FIG. 3 shows diagrammatically a device according to the invention in a particular embodiment allowing both measurements by transmission and measurements by reflection of the measurement beam.

Shown diagrammatically in FIG. 3 is another embodiment which, in addition to measurements by transmission, also allows measurements by reflection of the measurement beam FM off the component P (in order to determine the shape of the wave surface reflected by said component P).

For this purpose, the device according to the invention additionally includes:

a swivelling mirror M2, the as indicated by arrows $\vec{E2}$, which is arranged in the path of the measurement beam FM between the interferometer I (which is suitably placed) and the component P in such a way as to direct, by reflection, said measurement beam FM orthogonally onto the surface 2 of said component P; and an optical sensor CO integrated into the interferometer I and capable of determining the position of the image of a light point PO, shown diagrammatically, of the measurement beam FM, reflected by the surface 2 of the component P, said light point PO being located at a predefined reference position and the orientation of said mirror M2 being controlled in such a way as to bring the determined position of the image of the light point PO back to said reference position automatically.

The mirror M2 is controlled, automatically, at the required times prior to measurement, as indicated by a link L2, using a control means, preferably the control unit UC, which determines in real time the control commands for said mirror M2 on the basis of the measurements taken by said optical sensor CO.

Thus, by virtue of the automatic control of said mirror M2, the parallelism necessary for the measurement, in reflection mode, of a reflective component P is accurately adjusted in operating time.

Preferably, the orientation of said mirror M2 is refined, before each measurement of a measurement area ZM, on the basis of the processing of interference fringes measured by the interferometer I.

Of course, in the case of a measurement in reflection mode, the mirror M1 is not used since the measurement beam FM does not pass through the component P.

Consequently, the device in FIG. 3 can take:

either measurements in transmission mode, for which the mirror M1 is used to adjust the collimation and the mirror M2 to direct the measurement beam onto the component P;

or measurements in reflection mode, for which the mirror M2 performs the collimation and the mirror M1 is not used.

Figure 4:
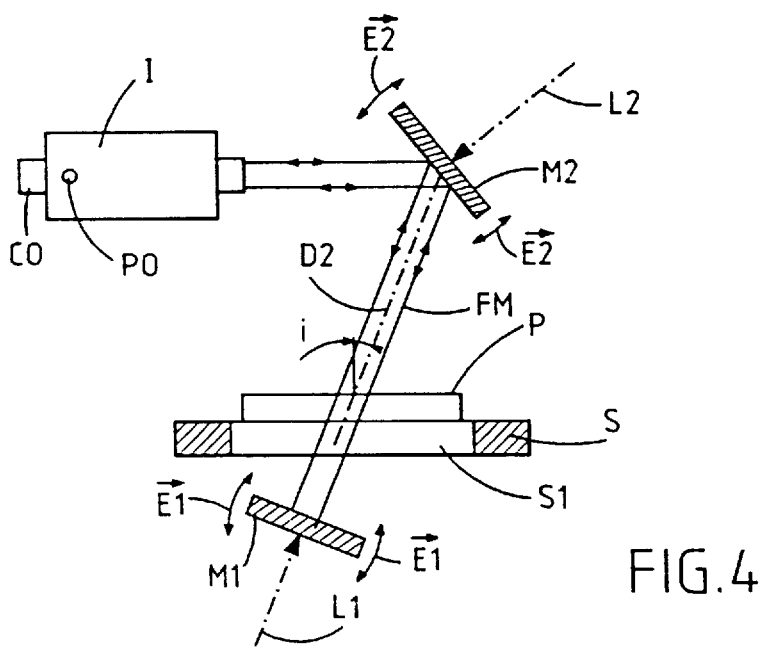
FIG. 4 shows diagrammatically another embodiment, with a measurement beam making a nonzero angle of incidence with the surface of the component to be measured.

In another embodiment, shown in FIG. 4, the mirrors M1 and M2 are oriented in such a way that the direction D2 of the measurement beam between the mirror M2 and the component P makes a nonzero angle of incidence i.

This embodiment enables measurements to be made at non-normal incidence without moving the entire device 1.

The device 1 according to the invention additionally includes a removable plate PL, shown partially in FIG. 1, having dimensions at least equal to the amounts of travel of the support S. This removable plate PL, which is capable of being mounted on the support S, is provided with a number of characteristic elements EC, the effective positions of which are known and are capable of being measured by the interferometer I. In the example shown, said characteristic elements EC are holes, for example 5 mm in diameter, which are spaced apart by 20 to 25 mm in the plane of the removable plate PL. The comparisons respectively between the positions measured by the interferometer I and the known effective positions of these characteristic elements EC make it possible to determine the precise relative position between the support S and the measurement beam FM emitted onto the component P.

I claim:

1. A device for determining the shape of the wave surface transmitted by a substantially parallel-faced transparent component (P), said device (1) including:

a support (S) bearing the component (P)

an interferometer (I) arranged opposite a surface (2) of the component (P), capable of emitting a measurement light beam (FM) onto a measurement area (ZM) of said surface (2) and of measuring the interference fringes created by the wave surface of said measurement beam (FM) transmitted by said transparent component (P) and the wave surface of said measurement beam (FM) reflected by a reference plate (5) arranged so as to be substantially parallel to said surface (2) of the component (P) over the path of said measurement beam (FM);

movement means (3, 4) enabling, by their action, said measurement beam (FM) to be scanned over the surface (2) of the component (P) so as to enable said interferometer (I) to take measurements on a number of measurement areas (ZM) completely covering said surface (2), each of said measurement areas (ZM) being at least partially overlapped, over an overlap sector (sr), by an adjacent measurement area; and a control unit (UC) which controls said interferometer (I) and said movement means (3, 4) and determines, from the measurements taken by said interferometer (I) on all the measurement areas (ZM), the shape of said wave surface transmitted by the component (P), the measurements taken on the overlap sectors (sr) being used to fit together the measurements taken on the corresponding adjacent measurement areas (ZM), wherein said support (S) is made, at least on its part bearing said component (P), in such a way as to let the measurement light beam (FM) emitted by the interferometer (I) and transmitted by said transparent component (P) pass through it, which device (1) additionally includes a first swivelling mirror (M1) which is arranged on the side opposite the interferometer (I) with respect to the support (S) and to the component (P) and which is placed in the path of the measurement beam (FM) emitted by the interferometer (I) and transmitted along a transmission direction (D1, D2) by the component (P) and the support (S), said first mirror (M1) being arranged approximately orthogonally to said transmitted measurement beam (FM) and being oriented in such a way as to send said measurement beam (FM) back in said transmission direction (D1, D2).

2. The device as claimed in claim 1, wherein the orientation of said first mirror (M1) is controlled by said control unit (UC).

3. The device as claimed in claim 1, which includes a second swivelling mirror (M2), which is arranged in the path of the measurement beam (FM) between the interferometer (I) and the component (P) in such a way as to direct the measurement beam (FM) emitted by said interferometer (I), by reflection, to said component (P).

4. The device as claimed in claim 3, wherein said second mirror (M2) is arranged in such a way as to direct the measurement beam (FM) in an inclined manner with respect to the surface (S) of the component (P).

5. The device as claimed in claim 3, wherein said second mirror (M2) is arranged in such a way as to direct the measurement beam (FM) orthogonally onto the surface (2) of the component (P), and wherein said device (1) additionally includes an optical sensor (CO) capable of determining the position of the image of a light point (PO) of the measurement beam, reflected by the surface (2) of the component (P), said light point (PO) being located at a predefined reference position and the orientation of said second mirror (M2) being controlled in such a way as to bring the position of the image of the light point (PO), determined by said optical sensor (CO), back to said reference position automatically.

6. The device as claimed in claim 5, wherein the orientation of said second, mirror (M2) is controlled by the control unit (UC) which receives the measurements taken by said optical sensor (CO).

7. The device as claimed in claim 5, wherein said optical sensor (CO) is integrated into the interferometer (I).

8. The device as claimed in claim 3, wherein, before each measurement of a measurement area (ZM), the orientation of said second mirror (M2) is refined on the basis of the processing of interference fringes measured by the interferometer (I).

9. The device as claimed in claim 1, which includes a removable plate (PL), having dimensions at least equal to the amounts of travel of the support (S), mounted on the support (S) and provided with a number of characteristic elements (EC), the effective positions of which are known and are capable of being measured by the interferometer (I), the comparisons respectively between the positions measured by the interferometer (I) and the known effective positions of these characteristic elements (EC) making it possible to determine the relative position between the support (S) and the measurement beam (FM) emitted onto the component (P).

10. The device as claimed in claim 9, wherein said characteristic elements (EC) are holes made in the removable plate (PL).

* * * * *